United States Patent [19]

Craven

[11] 4,121,795
[45] Oct. 24, 1978

[54] BRAKE DEVICE FOR USE IN A REMOTE ACTUATION SYSTEM
[75] Inventor: Donald Craven, Wolverhampton, England
[73] Assignee: Lucas Industries Limited, Birmingham, England
[21] Appl. No.: 779,997
[22] Filed: Mar. 22, 1977
[30] Foreign Application Priority Data
Mar. 25, 1976 [GB] United Kingdom ............... 12070/76
[51] Int. Cl.² ............................................. B64C 13/28
[52] U.S. Cl. ....................................... 244/213; 188/67; 188/134; 192/35; 192/38
[58] Field of Search ............ 188/67, 74, 82.81, 82.84, 188/134, 163, 342; 244/213; 192/35, 38
[56] References Cited
U.S. PATENT DOCUMENTS

| 3,300,002 | 1/1967 | Roper | 192/38 |
| 3,437,186 | 4/1969 | Roper | 192/38 |
| 3,482,666 | 12/1969 | Case et al. | 188/163 |
| 3,499,511 | 3/1970 | Bouhot | 188/134 |
| 3,542,162 | 11/1970 | Kerr et al. | 188/134 |
| 3,640,092 | 2/1972 | Neal et al. | 188/134 |

FOREIGN PATENT DOCUMENTS 1,627,043  8/1970  Fed. Rep. of Germany ............. 188/67

Primary Examiner—Edward R. Kazenske
Attorney, Agent, or Firm—Holman & Stern

[57] ABSTRACT

A braking device for a remote actuation system includes a plurality of balls or rollers interposed between a surface of a rotary member and a notched external surface of a housing. A cage for the balls or rollers is frictionally engaged with the rotary member so that when the case is free, it rotates with the rotary member and the balls or rollers moving in their notches thereby brake the rotary member. An electromagnetically operable device is coupled to the cage so that when energized it holds the cage in a central position so that braking does not then occur.

6 Claims, 7 Drawing Figures

BRAKE DEVICE FOR USE IN A REMOTE ACTUATION SYSTEM

This invention relates to a break device for use in a remote actuation system, for example an aircraft wing flap actuation system wherein a single actuator is connected by mechanical linkages to two or more widely spaced flaps.

In such a system it is important to ensure that in the event of one of the mechanical linkages becoming damaged, the associated flap is held in position and it is the object of the present invention to provide a braking device suitable for such duty.

A braking device in accordance with the invention comprises a housing, a rotary member journalled in the housing, a plurality of balls or rollers interposed between a surface on said rotary member and a surface on said housing, said surface on said housing being formed with a plurality of notches with which the balls or rollers are respectively associated, a cage for said balls or rollers, friction means acting between the cage and the rotary members tending to cause the cage to rotate with the rotary member and electromagnetically operable means co-operating with said cage so as to locate the cage in a position such that the balls or rollers are centrally disposed in their associated notches so that the rotary member is free to rotate relative to the housing when the electromagnetically operable means is in one state, but serving to free the cage when the electromagnetic means is in its other state to permit turning of the case under the influence of said friction means to a position in which the balls or rollers jam between said surfaces and prevent rotation of the rotary member.

The invention also resides in an aircraft wing flap actuation system including a common actuator connected by a plurality of linkages to a plurality of wing flaps respectively and a plurality of brakes devices as defined above having their rotary members connected to respective ones of the wing flaps.

In the accompanying drawings, which show an example of the invention:

FIG. 3 is a section on the line F—F in FIG. 2;

Figure 1:
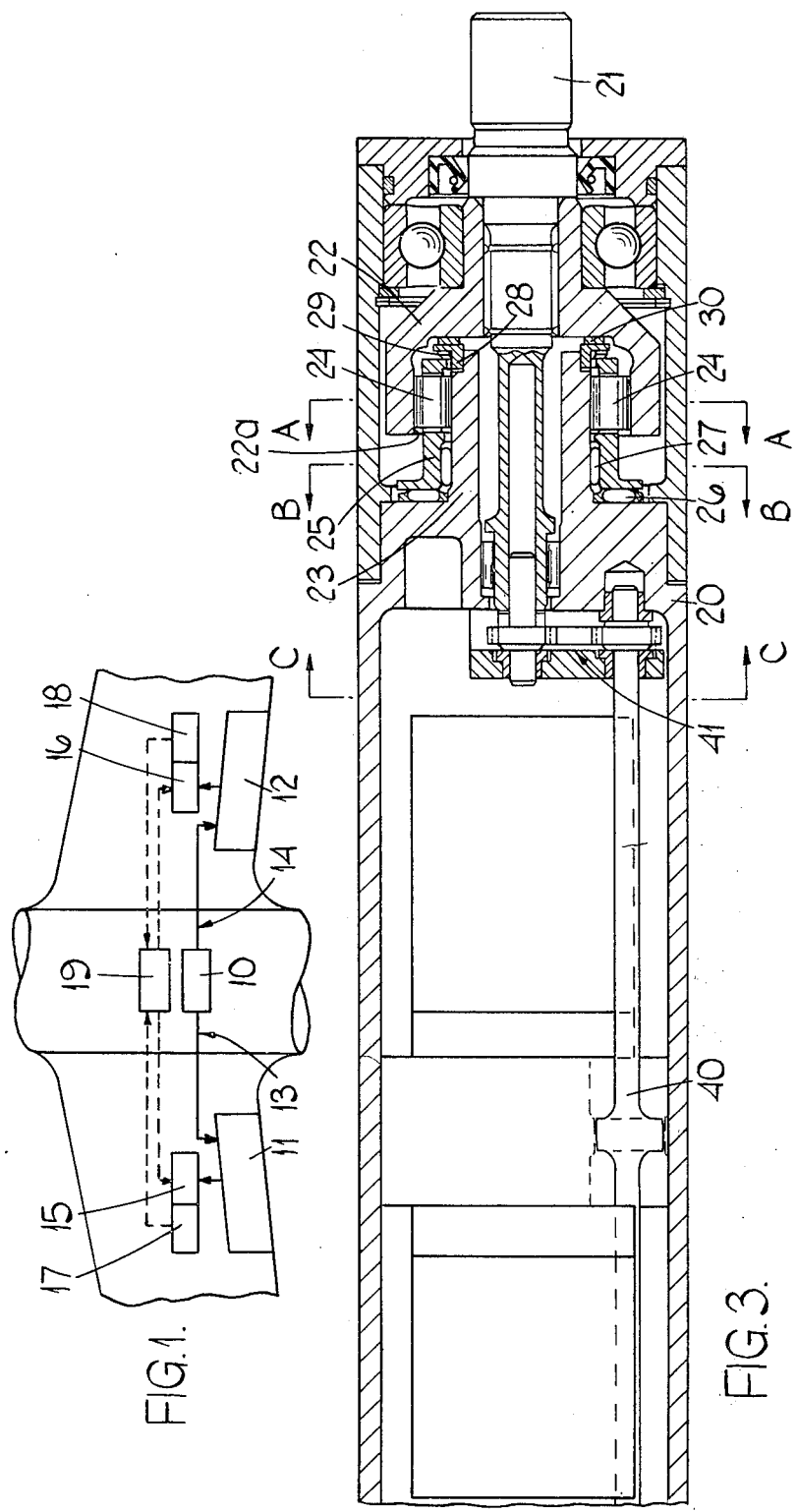
FIG. 1 is a diagrammatic view of an aircraft wing flap actuation system.

Referring firstly to FIG. 1 the system shown includes a common actuator 10 for the two wing flaps 11, 12 of the aircraft. A mechanical linkage 13 connects the actuator 10 to the flap 11 and a separate mechanical linkage 14 connects the actuator 10 to the flap 12.

A pair of brake devices 15, 16 are associated respectively with the two flaps 11, 12, these devices being shown in more detail in FIGS. 2 to 7. Each brake device also includes an electrical position transducer 17, 18 which supply electrical signals to an electronic control 19 which normally provides an output signal for energising electromagnetically operable devices associated with the brake devices 15, 16 as will be explained hereinafter. When the signals from the two transducers 17, 18 differ, indicating asymmetrical operation of the flaps, the control circuit 19 de-energises the electromagnetically operable devices to cause the brake devices 15, 16 to lock the flaps in position.

Figure 2:
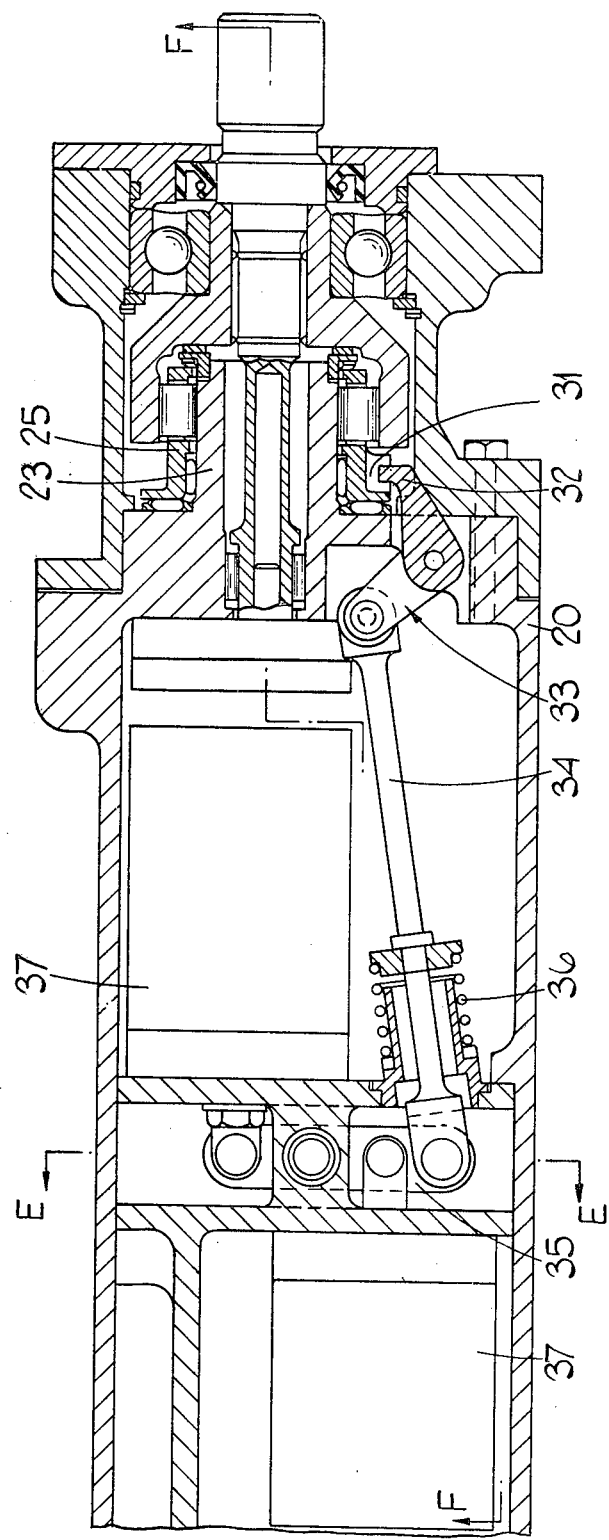
FIG. 2 is a sectional view of a braking device forming part of the system of FIG. 1.
Figure 4:
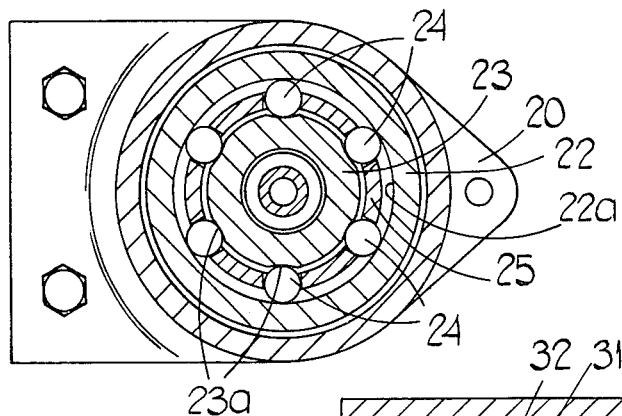
FIGS. 4 to 6 are sections on the respective lines A—A, B—B and C—C in FIG. 3.
Figure 5:
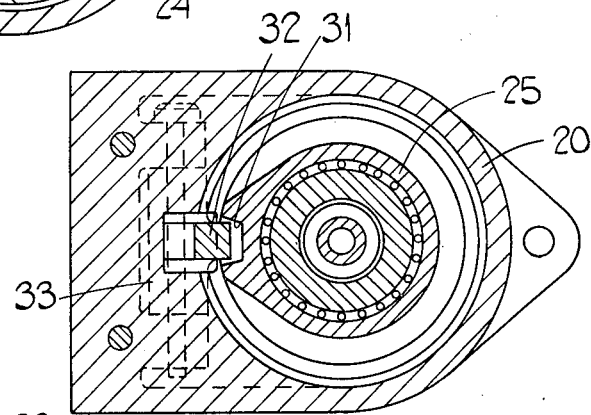
Figure 6:
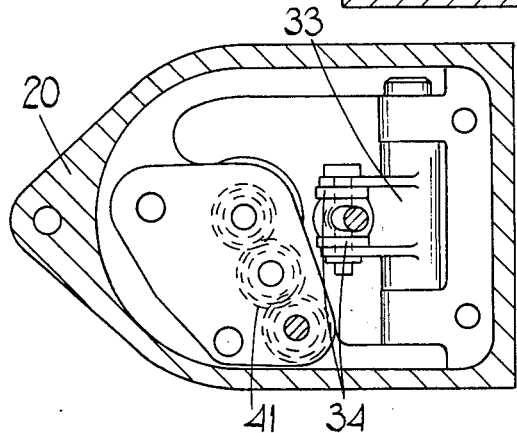
Figure 7:
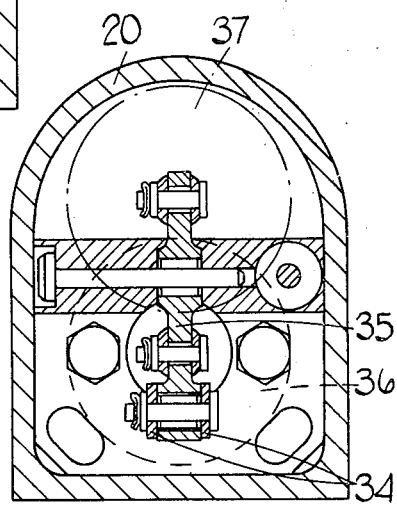
FIG. 7 is a section on the line E—E in FIG. 2.

Turning now to FIGS. 2 to 7, the brake device 15 shown includes a housing 20 in which a rotary member 21 is journalled (some parts are omitted from FIG. 2 but are shown in FIG. 3). Attached to the rotary member 21 is a cup-member 22 having an internal cylindrical surface 22a. Interposed between this surface 22a and a surface on a hollow spigot 23 attached to the housing 20 are a plurality of cylindrical rollers 24. As shown in FIG. 4 the surface of the spigot 23 is of generally cylindrical form but is provided with a plurality of notches 23a in which the respective rollers 24 are disposed. Although not shown in detail in the drawing each notch 23a consists of two flanks having an included angle of 164° so that each flank is inclined to a tangent at the intersection of the flanks of angle of 8°.

A cage 25 is provided for the rollers 24 and one end of this cage is rotatably supported on the housing 20 by a thrust bearing 26 and a journal bearing 27. The other end of the cage 25 is drivingly connected by splined dogs or otherwise to a ring 28 and a wavy-washer spring 29 is interposed between the cage 25 and the ring 28 to urge the latter to the right as viewed in FIG. 3 to engage a friction ring 30 within the cup-member 22. This arrangement ensures that when the member 21 is rotating a light torque load will be applied to the cage to tend to carry it in the direction of rotation of the member 21. Such turning of the cage will have the effect of causing each roller to run up one or other of the flanks of the associated notch to jam between the cup-member 22 and the spigot 23, thereby locking the member 21 against rotation of more than a predetermined angle (say 3°) in either direction.

To maintain the brake device in a disengaged condition it includes an electromagnetically operated device for locating the cage in a position in which the rollers 24 are centrally disposed in their respective notches and are therefore free to rotate. To this end the cage 25 is formed at said one end thereof with a tapered slot 31 (see FIG. 5) with which a pivotally mounted tapered dog 32 is engageable.

The dog 32 is on a bell-crank lever 33 connected by a link 34 to one end of a lever 35. A spring 36 acts on the link 34 to urge it in a direction to withdraw the dog 32 from the slot 31. The lever is movable by two solenoid devices 37 acting in concert to move the link 34 against the action of the spring 36. Two solenoids are employed to enable the required force to be obtained from a device of small cross-section, but clearly if more room were available a single solenoid could be substituted.

The position transducer 17 is not shown in FIGS. 2 to 7 but a lay shaft 40 which drives the transducer does appear. The shaft 40 is connected by a gear train 41 to the rotary member 21.

In use, whenever the solenoid 36, 37 are energised, the dog 32 is held in engagement with the slot 31 to locate the cage 25 with the balls free to rotate. When, as a result of a fault having been detected, the solenoids are de-energised, the cage is freed to cause the member 21 to be locked within 3° of its position at the time of the failure.

Clearly balls could be used instead of rollers 24 and tracks would then be required for the balls in the surfaces between which the balls were interposed.

In an alternative embodiment, not shown, the solenoids may be spring urged to the position locking the cage against rotation and when energised release the cage, thereby locking the brake.

I claim:

1. A braking device for use in a remote actuation system comprising a housing, a rotary member journaled in the housing, a plurality of balls or rollers interposed between a surface on said rotary member and a surface on said housing, said surface on said housing being formed with a plurality of notches with which the balls or rollers are respectively associated, a cage for said balls or rollers, friction means acting between the cage and the rotary member tending to cause the cage to rotate with the rotary member and electromagnetically operable means engageable and disengageable with said cage so as to hold the cage against rotation relative to said rotary member in a position such that the balls or rollers are centrally disposed in their associated notches whereby the rotary member is free to rotate relative to the housing when the electromagnetically operable means engages said cage, but serving to free the cage when the electromagnetically operated means disengages said cage to permit turning of the cage under the influence of said friction means to a position in which the balls or rollers jam between said surfaces and prevent rotation of the rotary member.

2. A braking device as claimed in claim 1 in which the cage is formed with a tapered slot and the electromagnetically operable means includes a dog movable into said slot.

3. A braking device as claimed in claim 2 in which said dog is pivotally mounted in the housing.

4. A. braking device as claimed in claim 3 in which the electromagnetically operable means also includes solenoid means and linkage means coupling said solenoid means to said pivotally mounted dog.

5. A braking device as claimed in claim 4 including spring means acting on said linkage means and urging said dog out of engagement with said tapered slot.

6. An aircraft wing flap actuation system comprising a common actuator connected by a plurality of linkages to a plurality of wing flaps respectively and a plurality of brake devices connected to respective ones of the wing flaps, each brake device comprising a housing, a rotary member journaled in the housing, said rotary member being connected to the respective wing flap, a plurality of balls or rollers interposed between a surface on said rotary member and a surface on said housing, said surface on said housing being formed with a plurality of notches with which the balls or rollers are respectively associated, a cage for said balls or rollers, friction means acting between the cage and the rotary member tending to cause the cage to rotate with the rotary member and electromagnetically operable means engageable and disengageable with said cage so as to hold the cage against rotation relative to said rotary member in a position such that the balls or rollers are centrally disposed in their associated notches whereby the rotary member is free to rotate relative to the housing when the electromagnetically operable means engages said cage, but serving to free the cage when the electromagnetically operated means disengages said cage to permit turning of the cage under the influence of said friction means to a position in which the bals or rollers jam between said surfaces and prevent rotation of the rotary member.

* * * * *